(12) United States Patent
Komanduri et al.

(10) Patent No.: US 12,393,025 B2
(45) Date of Patent: Aug. 19, 2025

(54) WAVEGUIDE COMBINERS HAVING ARRANGEMENTS FOR IMAGE UNIFORMITY

(71) Applicant: Applied Materials, Inc., Santa Clara, CA (US)

(72) Inventors: Ravi Komanduri, Santa Clara, CA (US); Jinxin Fu, Fremont, CA (US)

(73) Assignee: Applied Materials, Inc., Santa Clara, CA (US)

( * ) Notice: Subject to any disclaimer, the term of this patent is extended or adjusted under 35 U.S.C. 154(b) by 397 days.

(21) Appl. No.: 18/045,663

(22) Filed: Oct. 11, 2022

(65) Prior Publication Data

US 2023/0118998 A1   Apr. 20, 2023

Related U.S. Application Data

(60) Provisional application No. 63/256,226, filed on Oct. 15, 2021.

(51) Int. Cl.
*G02B 27/00* (2006.01)
*F21V 8/00* (2006.01)
*G02B 6/293* (2006.01)
*G02B 6/35* (2006.01)
*G02B 6/42* (2006.01)

(52) U.S. Cl.
CPC ....... *G02B 27/0081* (2013.01); *G02B 6/0026* (2013.01); *G02B 6/005* (2013.01); *G02B 6/29353* (2013.01); *G02B 6/3538* (2013.01); *G02B 6/4215* (2013.01)

(58) Field of Classification Search
CPC .. G02B 27/0081; G02B 6/0026; G02B 6/005; G02B 6/29353; G02B 6/3538; G02B 6/4215

USPC ............... 359/630; 345/7–9; 385/15, 27, 31
See application file for complete search history.

(56) References Cited

U.S. PATENT DOCUMENTS

| | | |
|---|---|---|
| 2017/0123208 A1 | 5/2017 | Vallius |
| 2017/0299865 A1 | 10/2017 | Vallius et al. |
| 2020/0159023 A1 | 5/2020 | Bhargava et al. |
| 2021/0011305 A1 | 1/2021 | Chang et al. |

FOREIGN PATENT DOCUMENTS

WO    2017-116637 A1    7/2017

OTHER PUBLICATIONS

PCT Notification of Transmittal of the International Search Report and the Written Opinion of the International Searching Authority for International Application No. PCT/US2022/046220; dated Feb. 3, 2023.

*Primary Examiner* — William Choi
(74) *Attorney, Agent, or Firm* — Patterson + Sheridan, LLP

(57) ABSTRACT

Embodiments described herein relate to waveguide combiners having arrangements for image uniformity. The waveguide combiners includes an input coupling grating (ICG) defined by a plurality of input structures, a pupil expansion grating (PEG) defined by a plurality of expansion structures, an output coupling grating (OCG) defined by a plurality of output structures The waveguide combiners includes at least one of a pixelated phase modulator is aligned with the PEG of the first side of the waveguide combiners, at least one of a Y expander and an X expander disposed on a second side of the waveguide combiners opposing the first side, or a pupil shifting mechanism operable to shift incident beams of light between a first position and a second position of the ICG.

20 Claims, 5 Drawing Sheets

WAVEGUIDE COMBINERS HAVING ARRANGEMENTS FOR IMAGE UNIFORMITY

RELATED APPLICATION(S)

This application claims benefit of and priority to U.S. Provisional Application No. 63/256,226, filed Oct. 15, 2021, which is herein incorporated in its entirety by reference for all purposes.

BACKGROUND

Field

Embodiments of the present disclosure generally relate to augmented reality waveguide combiners. More specifically, embodiments described herein relate to waveguide combiners having arrangements for image uniformity.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

One such challenge is displaying a virtual image overlaid on an ambient environment. Waveguide combiners are used to assist in overlaying images. Generated light is in-coupled into a waveguide combiner, propagated through the waveguide combiner, out-coupled from the waveguide combiner, and overlaid on the ambient environment. Light is coupled into and out of waveguide combiners using surface relief gratings. The propagation of light in waveguide combiners may result in non-uniformities of the virtual image.

Accordingly, what is needed in the art are waveguide combiners having arrangements for improved image uniformity.

SUMMARY

In one embodiment, a waveguide combiner is provided. The waveguide combiner includes an input coupling grating (ICG) defined by a plurality of input structures, a pupil expansion grating (PEG) defined by a plurality of expansion structures disposed over a first side of the waveguide combiner, an output coupling grating (OCG) defined by a plurality of output structures, a pixelated phase modulator disposed on a second side of the waveguide combiner opposing the first side of the waveguide combiner. The pixelated phase modulator is aligned with the PEG of the first side of the waveguide combiner.

In another embodiment, a waveguide combiner is provided. The waveguide combiner includes an input coupling grating (ICG) defined by a plurality of input structures disposed over a first side of the waveguide combiner, a pupil expansion grating (PEG) defined by a plurality of expansion structures, the PEG having at least one of a Y expander and an X expander disposed on a second side of the waveguide combiner opposing the first side, and an output coupling grating (OCG) defined by a plurality of output structures.

In yet another embodiment, a waveguide combiner is provided. The waveguide combiner an input coupling grating (ICG) defined by a plurality of input structures, a pupil expansion grating (PEG) defined by a plurality of expansion structures, an output coupling grating (OCG) defined by a plurality of output structures, and a pupil shifting mechanism operable to shift incident beams of light between a first position and a second position of the ICG.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments described herein relate to waveguide combiners to waveguide combiners having arrangements for image uniformity. The waveguide combiners includes an input coupling grating (ICG) defined by a plurality of input structures, a pupil expansion grating (PEG) defined by a plurality of expansion structures, an output coupling grating (OCG) defined by a plurality of output structures The waveguide combiners includes at least one of a pixelated phase modulator is aligned with the PEG of the first side of the waveguide combiners, at least one of a Y expander and an X expander disposed on a second side of the waveguide combiners opposing the first side, or a pupil shifting mechanism operable to shift incident beams of light between a first position and a second position of the ICG.

Figure 1:
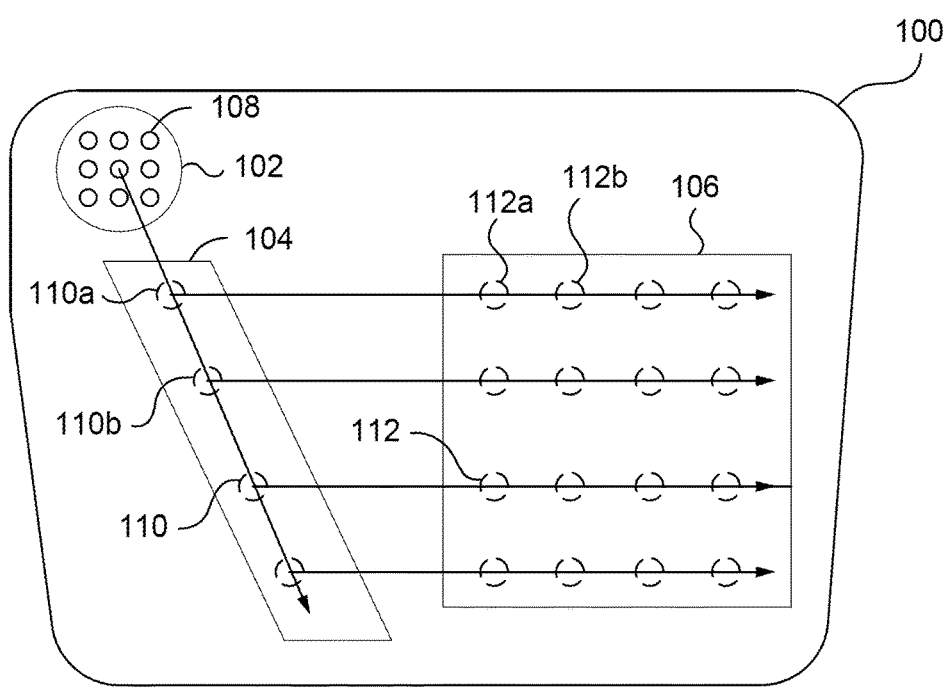
FIG. 1 is a perspective, frontal view of a waveguide combiner according to embodiments.

FIG. 1 is a perspective, frontal view of a waveguide combiner 100. It is to be understood that the waveguide combiner 100 described below is an exemplary waveguide combiner. The waveguide combiner 100 includes an input coupling grating (ICG) 102 defined by a plurality of input structures 108, a pupil expansion grating (PEG) 104 defined by a plurality of expansion structures 110, and an output coupling grating (OCG) 106 defined by a plurality of output structures 112. The ICG 102 receives incident beams of light (a virtual image) having an intensity from a microdisplay. Each grating of the plurality of input structures 108 splits the incident beams into a plurality of modes, each beam having a mode. Zero-order mode (T0) beams are either reflected back towards the microdisplay or are transmitted straight through the waveguide combiner 100, positive first-order mode (T1) beams are coupled though the waveguide combiner 100 to the PEG 104, and negative first-order mode (T−1) beams propagate in the waveguide combiner 100 a direction opposite to the T1 beams. Ideally, most of the incident beams are split into T1 beams that have all of the intensity of the incident beams in order to direct the virtual image to the PEG 104. The T1 beams undergo total-internal-reflection (TIR) through the waveguide combiner 100 until the T1 beams come in contact with the plurality of expansion structures 110 in the PEG 104.

The T1 beams contact an initial expansion structure 110a of the plurality of expansion structures 110. The T1 beams are split into T0 beams of the PEG 104 that continue propagating until the beams contact a successive expansion structure 110b of the plurality of expansion structures 110, or into T1 beams of the PEG 104 that are coupled through the waveguide combiner 100 to the OCG 106. The T1 beams that undergo TIR in the PEG 104 continue to contact expansion structures of the plurality of expansion structures 110 until the either the intensity of the T1 beams coupled through the waveguide combiner 100 to the PEG 104 is depleted, or remaining T1 beams propagating through the PEG 104 reach the end of the PEG 104. The PEG 104 must control the T1 beams undergoing TIR in the PEG 104 in order to control the intensity of the T−1 beams coupled to the OCG 106 over a field of view of the virtual image produced from the microdisplay from a user's perspective, and increase the eyebox over which multiple users can view the virtual image along the length of PEG 104.

The T−1 beams coupled through the waveguide combiner 100 to the OCG 106 undergo TIR in the waveguide combiner 100 until the T−1 beams contact an initial output structure 112a of the plurality of output structures 112 where the T−1 beams are split into either the T0 beams that continue propagating along the length of the OCG 106 interacting with a successive output structure 112b as part of a plurality of output structures 112, or into T1 beams are out-coupled by the OCG 106 out of the waveguide combiner 100 towards the user. The T0 beams that continue propagating along the length of the OCG 106 continue to contact output structures of the plurality of output structures 112 until the either the intensity of the T−1 beams coupled through the waveguide combiner 100 to the OCG 106 is depleted, or remaining T0 beams propagating through the OCG 106 have reached the end of the OCG 106.

Figure 2A:
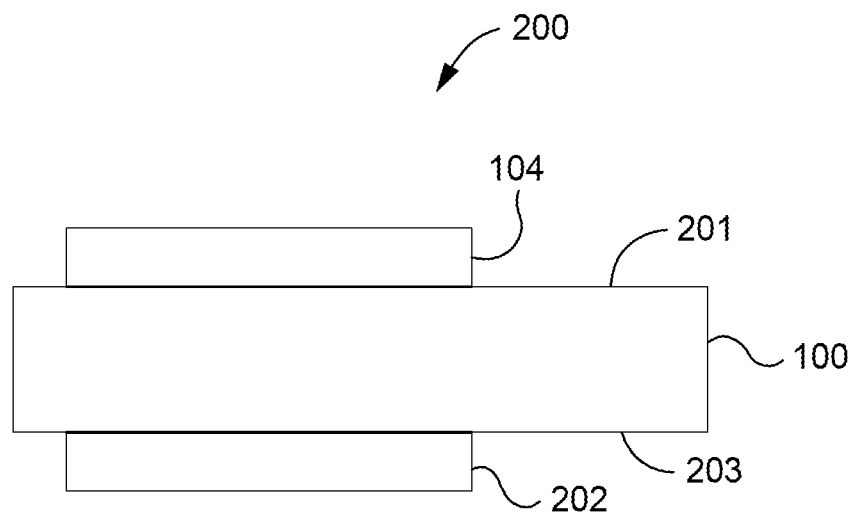
FIG. 2A is a schematic, cross-sectional view of a portion of a waveguide combiner according to embodiments.
Figure 2B:
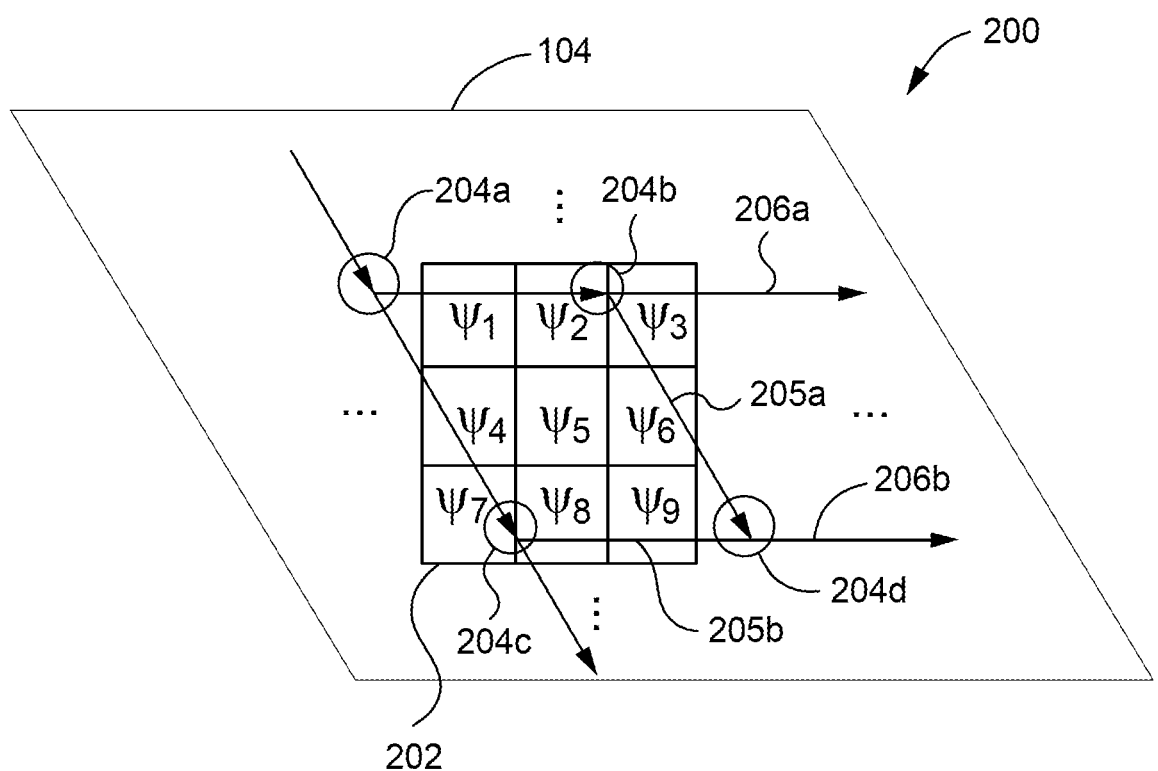
FIG. 2B is a schematic, top view of a portion of a waveguide combiner according to embodiments.

FIG. 2A is a schematic, cross-sectional view of a portion 200 of a waveguide combiner 100. FIG. 2B is a schematic, top view of the portion 200 of a waveguide combiner 100. The portion 200 of the waveguide combiner 100 includes the PEG 104 disposed on a first side 201 of the waveguide combiner 100 and a pixelated phase modulator 202 disposed on a second side 203 of the waveguide combiner 100 opposing the first side 201. The pixelated phase modulator 202 disposed on the second side 203 is aligned with the PEG 104 on the first side 201. In one example, the pixelated phase modulator includes pixels $\varphi_1$-$\varphi_9$ in a region where a Mach-Zehnder interference pattern could occur. The pixelated phase modulator 202 may be a spatial light modulator, such as a liquid crystal spatial light modulator (LC-SLM). The waveguide combiner 100 utilizes the pixelated phase modulator 202 such that a first T−1 beam 206a and a second T−1 beam 206b coupled to the OCG 106 have the same intensity.

For example, an incident beam contacting an initial expansion structure 204a can reach a third expansion structure 204d via two distinct paths. A first path includes T1 and T−1 diffractions by PEG 104 at the initial expansion structure 204a and a second expansion structure 204b leading to a beam 205a to the third expansion structure 204d. A second path includes T0 and T1 diffractions by PEG 104 at a successive expansion structure 204c and the third expansion structure 204d leading to a beam 205b arriving at the same location at the third expansion structure 204d. As a result of two distinct paths, the intensity of the second T−1 beam 206b is a function of the phase differences accumulated by the beams 205a and 205b via these two distinct paths. In conventional waveguide combiners, due to subtle changes in grating structures, and substrate profile that cannot be tightly controlled at a nanometer scale, this modulation leads to distinct non-uniform intensity distribution in the final images seen by the users at the OCG 106 since the first T−1 beam 206a and the second T−1 beam 206b both propagate towards the OCG 106. The pixelated phase modulator 202 disposed on the second side 203 is aligned with the PEG 104 on the first side 201 and has a resolution and phase modulation (0-2π) that ensures that the first T−1 beam 206a and the second T−1 beam 206b propagate to the OCG 106 with a uniform intensity for all angles within the field-of-view and eyebox of the waveguide combiner 100.

Figure 3:
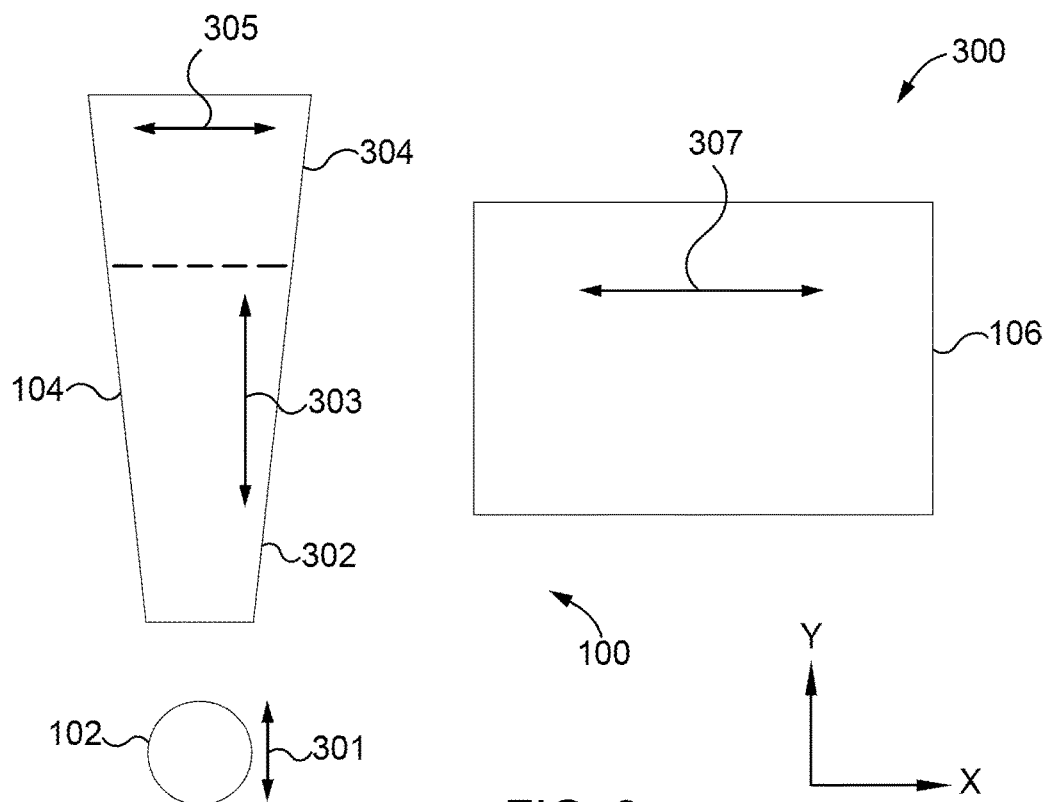
FIG. 3 is a schematic, top view of an arrangement of a waveguide combiner according to embodiments.

FIG. 3 is a schematic, top view of an arrangement 300 of the waveguide combiner 100. The waveguide combiner 100 of the arrangement 300 includes the ICG 102, the PEG 104, and the OCG 106. The PEG 104 has a Y expander 302 and an X expander 304. The Y expander 304 has a second grating vector 303 that is the same as a first grating vector 301 of the ICG 102. In one embodiment, a third grating vector 305 of the X expander 304 is orthogonal to the first grating vector 301 of the ICG 102. In one embodiment, a pitch of the plurality of expansion structures 110 of the X expander 304 is the same as a pitch of the plurality of input structures 108 of the ICG 102. A fourth grating vector 307 of the OCG 106 is the same as the third grating vector 305 of the X expander 304. At least one of the Y expander 302 and the X expander 304 is disposed on the second side 203 of the waveguide combiner 100 opposing the first side 201. In an embodiment, the Y expander 302 and the X expander 304 are disposed on opposite sides of the waveguide combiner 100. Disposing at least one of the Y expander 302 and the X expander 304 on the second side 203 opposing the first side 201 avoids a Mach-Zehnder interference pattern. At least one of the Y expander 302 and an X expander 304 on the second side 203 opposing the first side 201 provide for a uniform outcoupled image from the OCG 106 to the user's eye.

Figure 4A:
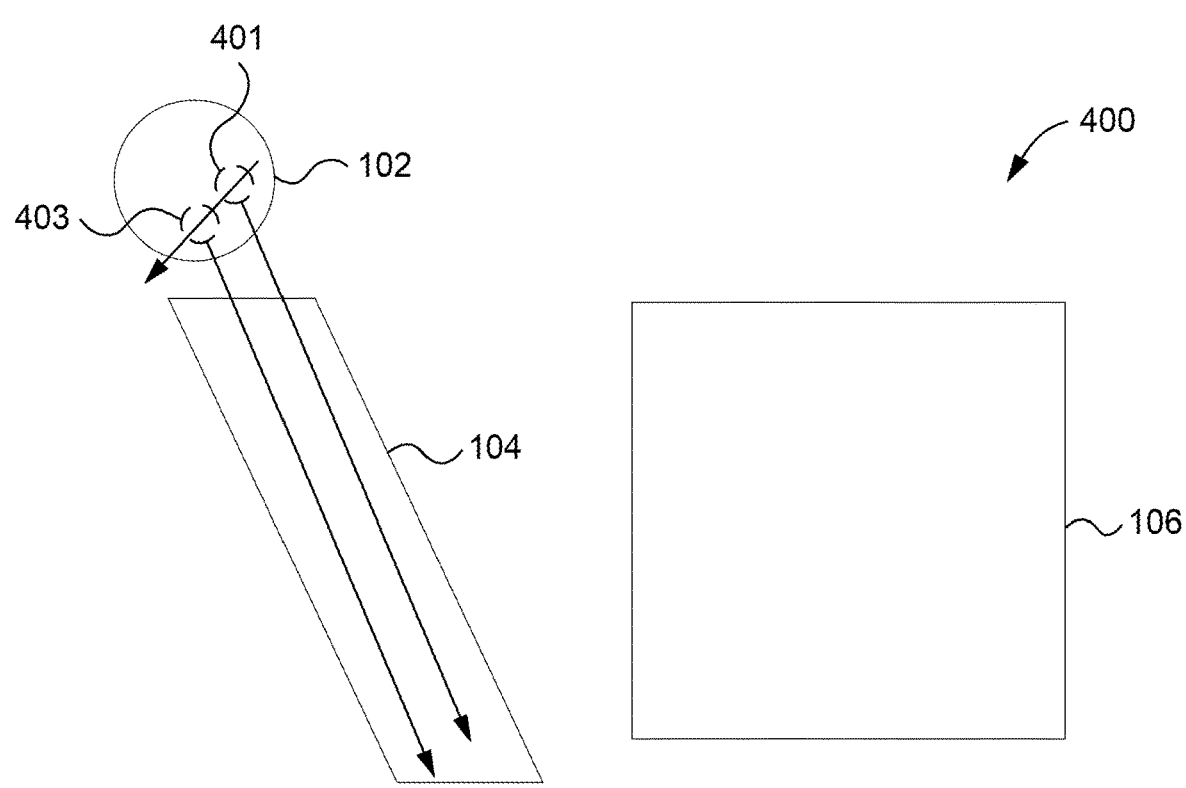
FIG. 4A is a schematic, top view of an arrangement of a waveguide combiner according to embodiments.
Figure 4B:
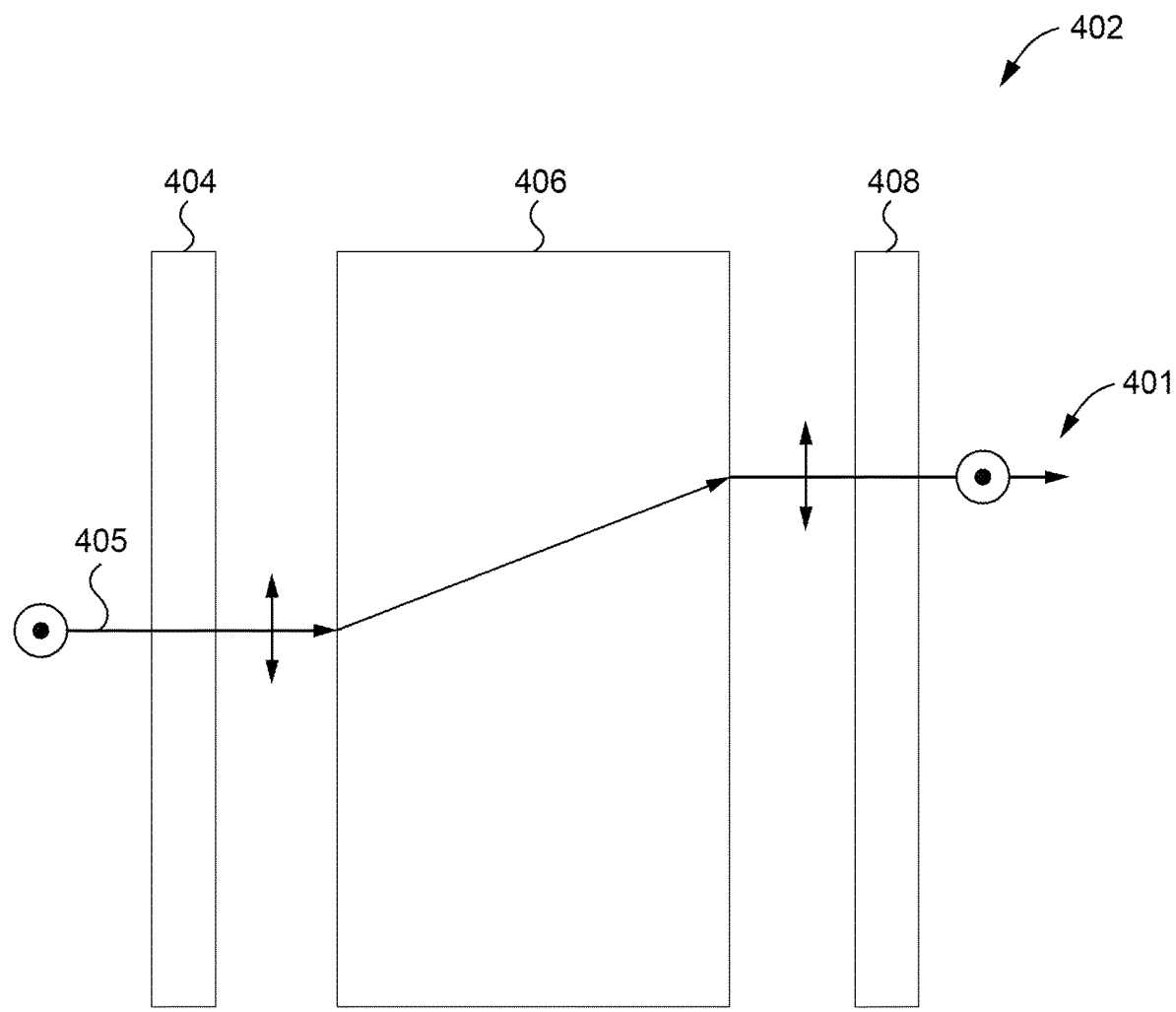
FIGS. 4B and 4C are schematic views of a pupil shifting mechanism of an arrangement of a waveguide combiner according to embodiments.
Figure 4C:
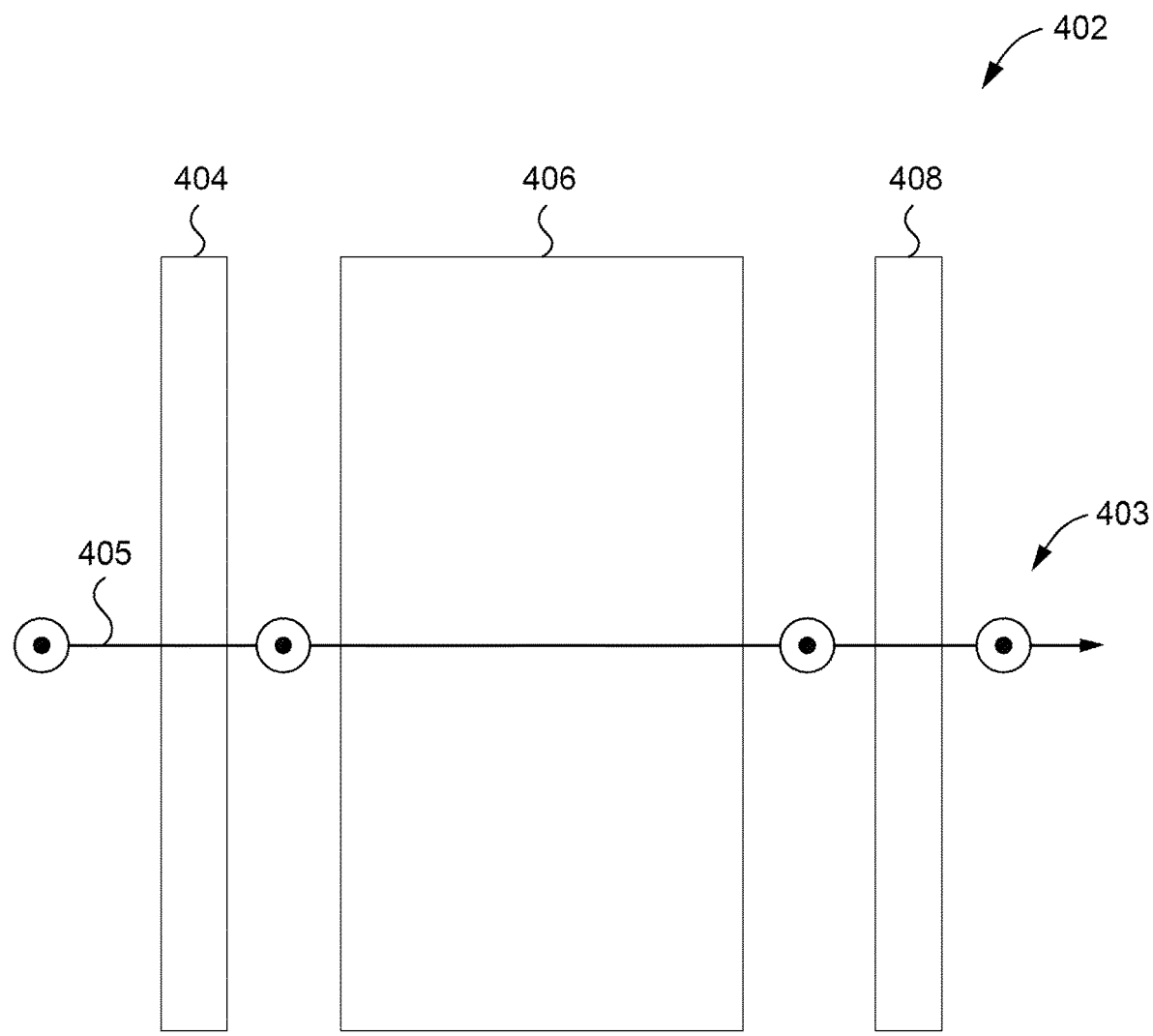

FIG. 4A is a schematic, top view of an arrangement 400 of the waveguide combiner 100. FIGS. 4B and 4C are schematic views of a pupil shifting mechanism 402 of the arrangement 400 of the waveguide combiner 100. The waveguide combiner 100 of the arrangement 400 includes the ICG 102, the PEG 104, and the OCG 106. The arrangement 400 includes a pupil shifting mechanism, such as a pupil shifting mechanism 402. The pupil shifting mechanism 402 includes a first liquid crystal (LC) switch 404, a birefringent slab 406, and a second LC switch 408.

In an embodiment, which can be combined with other embodiments herein, an optical axis of the birefringent slab 406 is tilted with respect to a surface of the ICG 102. As shown in FIG. 4B, when no voltage is applied to the first LC switch 404, an incident beam 405 is diffracted at an angle by the birefringent slab 406 via a change in polarization of the incident beam to displace the incident beam 405. When no voltage is applied to the second LC switch 408, the second LC switch 48 changes the polarization of the shifted incident beam 405 to be incident of a first position 401. As shown in FIG. 4C, when a voltage is applied to the first LC switch 404 and the second LC switch 408, an incident beam 405 is projected through the birefringent and is incident of a second position 403. The pupil shifting mechanism therefore shifts incident beams of light (the virtual image) between the first position 401 and the second position 403 on the ICG 102. The shifting of the incident beams on the ICG 102 has the effect of averaging, and thus improving, the intensity patterns from these corresponding positions 401, 403 to the user's eye at the OCG 106.

While the foregoing is directed to examples of the present disclosure, other and further examples of the disclosure may be devised without departing from the basic scope thereof, and the scope thereof is determined by the claims that follow.

What is claimed is:

1. A waveguide combiner, comprising:
   an input coupling grating (ICG) defined by a plurality of input structures;
   a pupil expansion grating (PEG) defined by a plurality of expansion structures disposed over a first side of the waveguide combiner;
   an output coupling grating (OCG) defined by a plurality of output structures; and
   a pixelated phase modulator disposed on a second side of the waveguide combiner opposing the first side of the waveguide combiner, the pixelated phase modulator aligned with the PEG of the first side of the waveguide combiner.

2. The waveguide combiner of claim 1, wherein the pixelated phase modulator is a liquid crystal spatial light modulator (LC-SLM).

3. The waveguide combiner of claim 1, wherein the PEG is operable to diffract and out-couple a beam interacting with the PEG as a first T−1 beam and a T−1 second beam with different local intensities and wherein the pixelated phase modulator is configured to tune the first and second T−1 beams from the PEG and out-couple them to the OCG with a uniform intensity for all angles.

4. The waveguide combiner of claim 3, wherein the pixelated phase modulator is configured to tune a phase difference between the first T−1 beam and the second T−1 beam diffracted and out-coupled by the PEG.

5. The waveguide combiner of claim 1, wherein the pixelated phase modulator comprises a plurality of pixels in a region where a Mach-Zehnder interference pattern by a beam interacting with the PEG could occur.

6. A waveguide combiner, comprising:
   an input coupling grating (ICG) defined by a plurality of input structures disposed over a first side of the waveguide combiner;
   a pupil expansion grating (PEG) defined by a plurality of expansion structures, the PEG having at least one of a Y expander and an X expander disposed on a second side of the waveguide combiner opposing the first side; and
   an output coupling grating (OCG) defined by a plurality of output structures.

7. The waveguide combiner of claim 6, wherein the Y expander has a second grating vector that is the same as a first grating vector of the ICG.

8. The waveguide combiner of claim 6, wherein the X expander has a third grating vector that is orthogonal to a first grating vector of the ICG.

9. The waveguide combiner of claim 6, wherein the X expander has a third grating vector with a first pitch that is the same as a second pitch of a first grating vector of the ICG.

10. The waveguide combiner of claim 6, wherein the X expander has a third grating vector that is the same as a fourth grating vector of the OCG.

11. The waveguide combiner of claim 6, wherein the Y expander and the X expander are on opposite sides of the waveguide combiner.

12. The waveguide combiner of claim 6, wherein the at least one of the Y expander and the X expander disposed on the second side of the waveguide combiner is operable to provide a uniform out-coupled image from the OCG.

13. The waveguide combiner of claim 6, wherein the at least one of the Y expander and the X expander disposed on the second side of the waveguide combiner is operable to avoid interference caused by splitting of beams interacting with the PEG.

14. A waveguide combiner, comprising:
   an input coupling grating (ICG) defined by a plurality of input structures;
   a pupil expansion grating (PEG) defined by a plurality of expansion structures;
   an output coupling grating (OCG) defined by a plurality of output structures; and
   a pupil shifting mechanism operable to shift incident beams of light between a first position and a second position of the ICG.

15. The waveguide combiner of claim 14, wherein the pupil shifting mechanism comprises a first liquid crystal (LC) switch, a birefringent slab, and a second LC switch.

16. The waveguide combiner of claim 15, wherein when no voltage is applied to the first and second LC switches, the pupil shifting mechanism is operable to diffract and displace incident beams of light to be incident of the first position.

17. The waveguide combiner of claim 15, wherein when a voltage is applied to the first and second LC switches, the pupil shifting mechanism is operable to project incident beams of light through the birefringent slab to be incident of the second position.

18. The waveguide combiner of claim 15, wherein the birefringent slab comprises an optical axis that is tilted with respect to a surface of the ICG.

19. The waveguide combiner of claim 15, wherein the first and second LC switches comprise half wave plates with an optic axis that is oriented 45 degrees with respect to a linear polarization of incident beams of light.

20. The waveguide combiner of claim 14, wherein the pupil shifting mechanism is operable to average intensity patterns of incident beams of light from each of the corresponding first and second positions to a user's eye at the OCG.

* * * * *